United States Patent
Su et al.

(10) Patent No.: US 7,724,623 B2
(45) Date of Patent: May 25, 2010

(54) READING METHOD OF OPTICAL DISC DRIVE FOR READING DISC AND FINDING IF DISC IS PLACED REVERSELY

(75) Inventors: Po-Chuan Su, Hsinchu (TW); Yi-Chuan Pan, Hsinchu (TW); Mu-Shu Tsai, Hsinchu (TW)

(73) Assignee: Lite-on It Corporation, Hsinchu (TW)

( * ) Notice: Subject to any disclaimer, the term of this patent is extended or adjusted under 35 U.S.C. 154(b) by 502 days.

(21) Appl. No.: 11/892,575

(22) Filed: Aug. 24, 2007

(65) Prior Publication Data

US 2008/0049564 A1   Feb. 28, 2008

(30) Foreign Application Priority Data

Aug. 25, 2006  (TW) .............................. 95131441 A

(51) Int. Cl.
   *G11B 7/00*   (2006.01)
(52) U.S. Cl. .................................................. 369/53.22
(58) Field of Classification Search ........................ None
   See application file for complete search history.

(56) References Cited

U.S. PATENT DOCUMENTS

| 6,262,957 | B1* | 7/2001 | Inoue et al. | ............... 369/53.23 |
| 7,129,968 | B2* | 10/2006 | Morishima | ................... 347/253 |
| 2004/0130988 | A1* | 7/2004 | Weng et al. | ................. 369/53.2 |
| 2005/0108741 | A1* | 5/2005 | Cookson et al. | ............. 720/659 |
| 2007/0014218 | A1* | 1/2007 | Morishima | ................... 369/47.5 |

* cited by examiner

*Primary Examiner*—Joseph H Feild
*Assistant Examiner*—Joseph Haley
(74) *Attorney, Agent, or Firm*—Bacon & Thomas, PLLC

(57) ABSTRACT

A reading method for finding if a disc is placed reversely used in an optical disc drive is provided. The optical disc drive has a spindle motor, an optical pickup head having a lens, a fine actuator and a sled actuator. Firstly, a disc is placed into the optical disc drive. Next, the spindle motor rotates the disc. After that, a laser light of the optical pickup head is shot on the disc. Next, the lens is moved such that the laser light follows a single data track. Then, a central error signal of the lens is measured continuously. Afterwards, if the central error signal increases progressively, the optical disc drive finds the disc placed reversely, and the disc is ejected from the optical disc drive.

10 Claims, 2 Drawing Sheets

READING METHOD OF OPTICAL DISC DRIVE FOR READING DISC AND FINDING IF DISC IS PLACED REVERSELY

This application claims the benefit of Taiwan application Serial No. 95131441, filed Aug. 25, 2006, the subject matter of which is incorporated herein by reference.

BACKGROUND OF THE INVENTION

1. Field of the Invention

The invention relates in general to a reading method of an optical disc drive, and more particularly to a reading method of an optical disc drive for reading a disc and finding if a disc is placed reversely.

2. Description of the Related Art

As the demand for high capacity memory storage medium increases, the use of discs plays an ever more important role. However, how to quickly, stably and correctly read data from the disc is still a focus of research and development to manufacturers.

In a conventional optical disc drive, the disc is placed on a spindle motor, then the spindle motor drives the disc to rotate. The disc has many tracks on which digital data is stored. The digital data is read by an optical pickup head disposed on a sled. After the sled is driven by a sled motor, the optical pickup head is moved to an appropriate position to read data from the disc.

However, the user may happen to place a disc into an optical disc drive incorrectly. For example, the disc is reversely placed in the optical disc drive. Meanwhile, the optical disc drive still continues to read data from the disc. As the disc is placed reversely, the optical disc drive can not read data from the disc successfully. After a number of error retries, the optical disc drive finds that data can not be read and ejects the disc from the optical disc drive accordingly. During the process of error retry, the optical disc drive continues to make annoying noise, which will not disappear until the disc is ejected from the optical disc drive. Particularly, if the optical disc drive is able to focus on the disc placed reversely, the optical disc drive takes longer time to come to the decision that data can not be read and the disc has to be ejected.

SUMMARY OF THE INVENTION

The invention is directed to a reading method of an optical disc drive for reading a disc and quickly finding if the disc is placed reversely, such that the occurrence of noise is reduced.

According to a first aspect of the present invention, a reading method for finding if a disc is placed reversely used in an optical disc drive is provided. The optical disc drive has a spindle motor, an optical pickup head, a fine actuator and a sled actuator, wherein the optical pickup head has a lens. The reading method includes the following steps. Firstly, a disc is placed into the optical disc drive. Next, the spindle motor is driven to rotate the disc. After that, a laser light of the optical pickup head is shot on the disc. Next, the lens is moved such that the laser light follows a single data track on the disc. Then, a central error signal of the lens is measured continuously. Afterwards, if the level of the central error signal increases progressively, the optical disc drive finds the disc placed reversely.

According to a second aspect of the present invention, a reading method of an optical disc drive for reading the disc placed therein is provided. The optical disc drive has an optical pickup head which has a lens. The reading method of the optical disc drive includes the following steps. Firstly, a disc is rotated. Next, a laser light of the optical pickup head is shot on the disc. Afterwards, the lens is moved such that the laser light follows a single data track on the disc. Then, a central error signal of the lens is measured continuously. Lastly, the disc is ejected from the optical disc drive if the level of the central error signal increases progressively.

The invention will become apparent from the following detailed description of the preferred but non-limiting embodiments. The following description is made with reference to the accompanying drawings.

DETAILED DESCRIPTION OF THE INVENTION

The invention provides a reading method which quickly finds if a disc is placed reversely in an optical disc drive such that the occurrence of noise is reduced.

Figure 1:
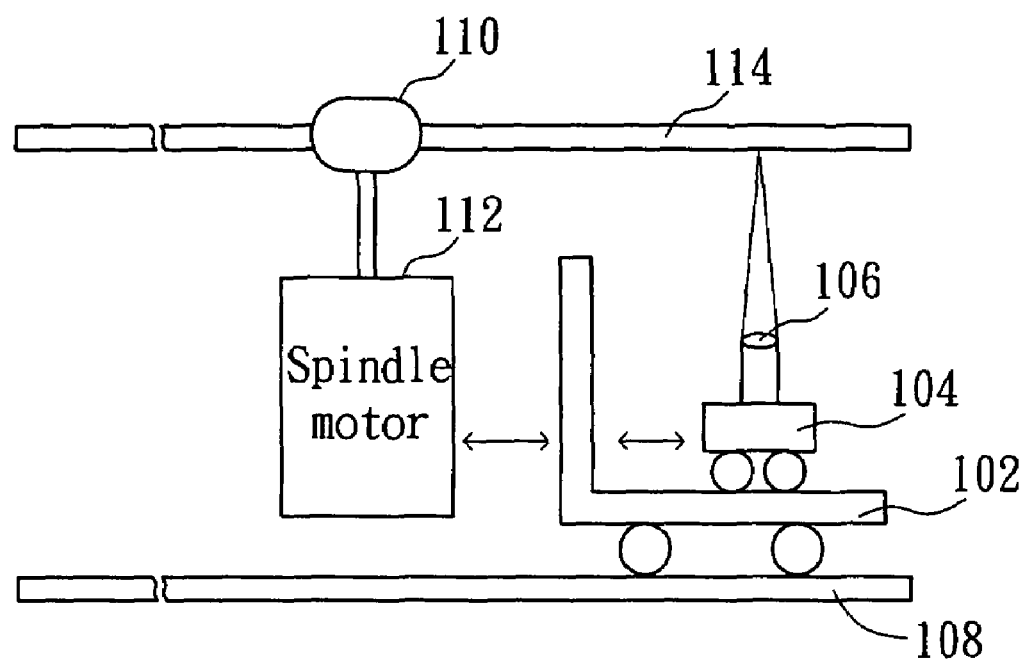
FIG. 1 is a perspective of a dual actuator system of an optical disc drive according to a preferred embodiment of the invention.

Referring to FIG. 1, a perspective of a dual actuator system of an optical disc drive according to a preferred embodiment of the invention is shown. In the optical disc drive 100, the dual actuator system is formed by a sled actuator 102 and a fine actuator 104, wherein the lens 106 of the optical pickup head (not illustrated in the diagram) is disposed on the fine actuator 104. During the track-seeking process, the sled actuator 102 drives the fine actuator 104 to move reciprocally on the actuator guiding rod 108 along the radius of a disc 114 such that a laser light is projected on a data track of the disc 114. The lens 106 of the optical pickup head is moved by the fine actuator 104 such that the laser light follows the data track of the disc 114.

The disc 114 is fixed by a clamping mechanism 110 and driven by a spindle motor 112. The laser light is precisely projected on the data track of the disc 114 and can be moved along the data track by controlling the sled actuator 103 and the fine actuator 104 appropriately. Normally, the sled actuator 102 is a sled motor, the fine actuator 104 is a voice coil motor (VCM), and the lens 106 is connected to the sled via a spring coil of the voice coil motor.

Figure 2:
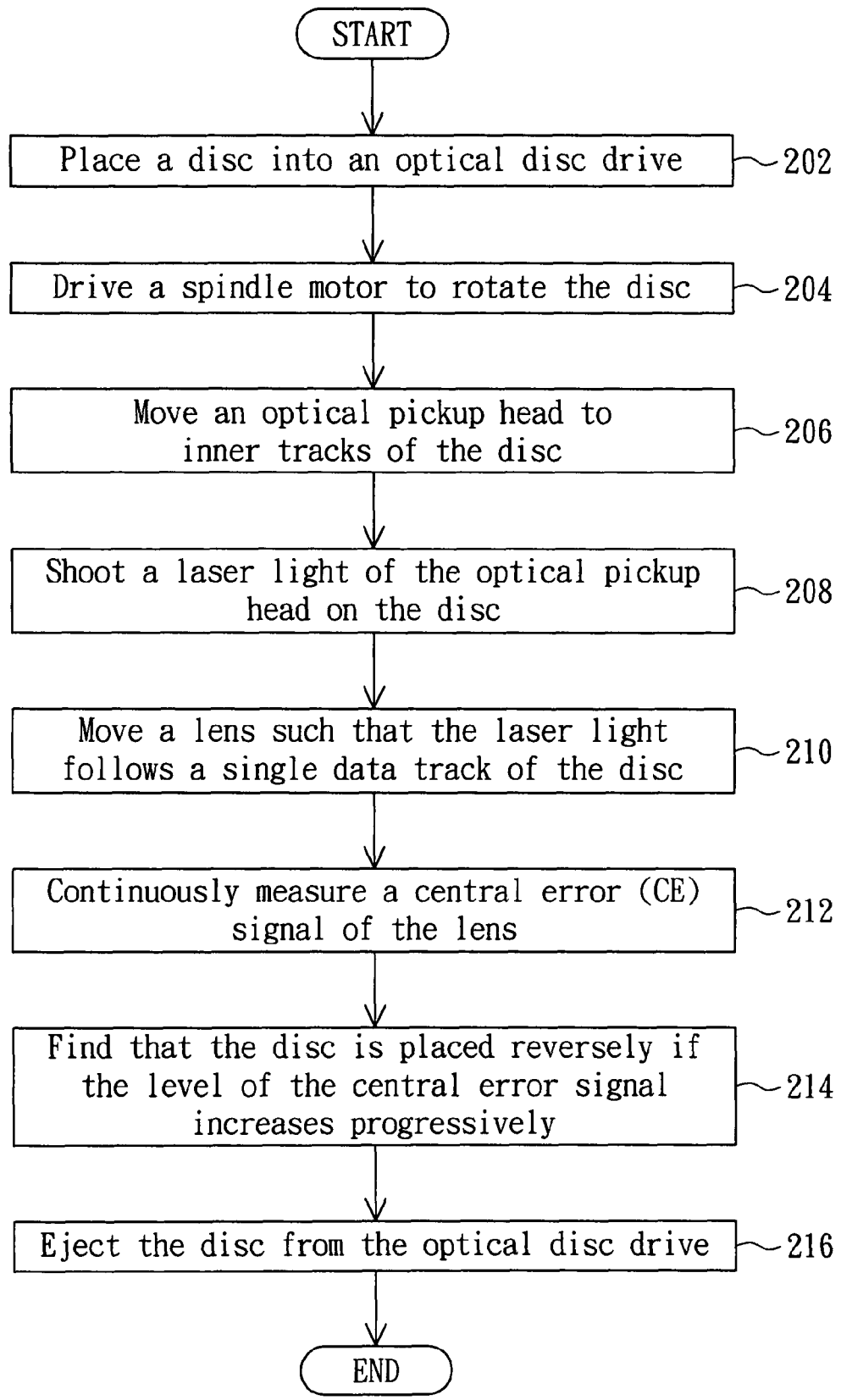
FIG. 2 is a flowchart of a reading method for finding if a disc is placed reversely according to a preferred embodiment of the invention.

Referring to FIG. 2, a flowchart of a reading method for finding if a disc is placed reversely according to a preferred embodiment of the invention is shown. Firstly, the method begins at step 202, a disc 114 is placed into the optical disc drive 100. Next, the method proceeds to step 204, a spindle motor 112 is driven to rotate the disc 114. Then, the method proceeds to step 206, an optical pickup head (not illustrated in FIG. 1) is moved to inner tracks of the disc 114; meanwhile, the disc 114 rotates on the optical pickup head. In the preferred embodiment of the invention, the sled actuator 102 drives the optical pickup head to move to inner tracks of the disc 114 along the actuator guiding rod 108. Next, the method proceeds to step 208, a laser light of the optical pickup head precisely is shot on the disc.

Then, the method proceeds to step 210, a lens 106 of the optical pickup head is moved such that the laser light follows a single data track of the disc 114 so as to complete the track-seeking process. In the preferred embodiment of the invention, the fine actuator 104 moves the lens 106 of the optical pickup head so that the laser light can focus on a single data track of the disc 114 and can follow the single data track when the disc 114 is rotated by the spindle motor 112. Then, the method proceeds to step 212, a central error (CE) signal of the lens 106 is measured continuously. The central error (CE) signal denotes an error between a current position and a natural position of the lens 106 and is normally exemplified by central error signals CE[0], CE[1] and CE[2].

In normal reading operation, a disc is placed into the optical disc drive 100 correctly. As the disc is rotated by the spindle motor 112, the lens 106 follows a single data track and moves outwardly, and the level of the central error signal decreases progressively as the lens 106 moves outwardly, that is, CE[2]<CE[1]<CE[0]. However, if the disc is placed reversely, the optical disc drive 100 finds that the lens 106 follows a single data track and moves inwardly. Thus, in step 214, it is measured that the level of the central error signal increases progressively, that is, CE[2]>CE[1]>CE[0], if the disc is placed reversely. This implies that the rotating direction of the data track is different, therefore the optical disc drive 100 finds that the disc 114 is placed reversely. Next, the method proceeds to step 216, the optical disc drive 100 stops reading the disc 114 and ejects the disc 114.

The reading method for finding if a disc is placed reversely disclosed in the above embodiment of the invention finds if a disc is placed reversely according to whether the level of the central error signal of the optical disc drive increases progressively or not. Thus, the method can quickly find if a disc is placed reversely, then stop error retry and eject the disc from the optical disc drive. Meanwhile, the occurrence of noise is reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A reading method for finding if a disc is placed reversely used in an optical disc drive, wherein the optical disc drive has a spindle motor, an optical pickup head, a fine actuator and a sled actuator, the optical pickup head has a lens, the reading method of finding if a disc is placed reversely comprises the steps of:
   placing a disc into the optical disc drive;
   driving the spindle motor to rotate the disc;
   shooting a laser light of the optical pickup head on the disc;
   moving the lens such that the laser light follows a single data track of the disc;
   continuously measuring a central error (CE) signal of the lens; and
   finding that the disc is placed reversely if the level of the central error signal increases progressively.

2. The reading method for finding if a disc is placed reversely according to claim 1, wherein the lens is disposed on the fine actuator.

3. The reading method for finding if a disc is placed reversely according to claim 1, wherein the central error signal denotes an error between a current position and a natural position of the lens.

4. The reading method for finding if a disc is placed reversely according to claim 1, wherein if the level of the central error signal decreases progressively, the optical disc drive finds that the disc is placed correctly and continues to read data from the disc.

5. The reading method for finding if a disc is placed reversely according to claim 1 further comprises the step of ejecting the disc from the optical disc drive if the level of the central error signal increases progressively.

6. The reading method for finding if a disc is placed reversely according to claim 1 further comprises the step of moving the optical pickup head to inner tracks of the disc before shooting the laser light of the optical pickup head on the disc.

7. A reading method of an optical disc drive used for reading a disc placed therein, wherein the optical disc drive has an optical pickup head which has a lens, the reading method of an optical disc drive comprises the steps of:
   rotating the disc;
   shooting a laser light of the optical pickup head on the disc;
   moving the lens such that the laser light follows a single data track of the disc;
   continuously measuring a central error (CE) signal of the lens; and
   ejecting the disc from the optical disc drive if the level of the central error signal increases progressively.

8. The reading method of an optical disc drive according to claim 7, wherein the central error signal denotes an error between a current position and a natural position of the lens.

9. The reading method of an optical disc drive according to claim 7, wherein if the level of the central error signal decreases progressively, the optical disc drive continues to read data from the disc.

10. The reading method of an optical disc drive according to claim 7 further comprises the step of moving the optical pickup head to inner tracks of the disc before shooting the laser light of the optical pickup head on the disc.

* * * * *